United States Patent [19]
Mita et al.

[11] Patent Number: 6,031,834
[45] Date of Patent: Feb. 29, 2000

[54] SIGNAL SWITCHING METHOD AND APPARATUS

[75] Inventors: Michio Mita; Kimiyasu Satoh, both of Kanagawa, Japan

[73] Assignee: Sony Corporation, Tokyo, Japan

[21] Appl. No.: 08/831,687

[22] Filed: Apr. 10, 1997

[30] Foreign Application Priority Data

Apr. 12, 1996 [JP] Japan .................................. 8-091286

[51] Int. Cl.⁷ ...................................................... H04L 12/50
[52] U.S. Cl. ............................................. 370/360; 370/396
[58] Field of Search .................................... 370/352, 353, 370/355, 427, 360, 396, 362, 369, 386, 357, 367, 370, 387, 388

[56] References Cited

U.S. PATENT DOCUMENTS 5,422,881   6/1995   May et al. ............................. 370/392

*Primary Examiner*—Chi H. Pham
*Assistant Examiner*—Kim T. Nguyen
*Attorney, Agent, or Firm*—Frommer Lawerence & Haug, LLP; William S. Frommer

[57] ABSTRACT

According to the present invention, it is possible to provide a signal switching apparatus for reducing cross point identification name data stored in a memory required to generate switching control data according to a combination of a selected destination operating switch and a selected source operating switch so that a memory capacity of the memory can be reduced.

4 Claims, 7 Drawing Sheets

SIGNAL SWITCHING METHOD AND APPARATUS

BACKGROUND OF THE INVENTION

1. Field of the Invention

The present invention relates to a signal switching method and a signal switching apparatus using a routing switcher (matrix switcher).

2. Description of the Prior Art

A conventional signal switching apparatus of this kind will be explained.

This signal switching apparatus has a switching control means and a control unit described later. The switching control means controls the operation of a routing switcher having plural input terminals and plural output terminals and the operations of cross point switches of the routing switcher. A combination of selected cross point switches among the plural cross point switches of the routing switcher is simultaneously turned on by the switching control means. Thus, a source information signal from an input side information equipment (source equipment) such as an audio unit, a video unit, a video/audio unit, etc. connected to an input terminal corresponding to each of the selected cross point switches is supplied to an output side information equipment (destination equipment) such as an audio unit, a video unit, a video/audio unit, etc. connected to an output terminal corresponding to each of the selected cross point switches.

Plural combinations of the cross point switches are set in the routing switcher. A phantom identification name {phantom identification code} is provided to each of the combinations of the cross point switches. For example, the phantom identification name is a nickname and the phantom identification code is a number.

A source identification name (or source identification code) and a destination identification name (or destination identification code) are respectively provided to a combination of the input terminals and a combination of the output terminals corresponding to a certain combination of the cross point switches of the routing switcher. An input information signal (source information signal) supplied to the combination of the input terminals having the source identification name is not limited to an information signal from one input side information equipment (source information equipment), but is constructed by information signals from plural input side information equipment (source information equipment) in a certain case. Similarly, an output information signal (destination information signal) outputted from the combination of the output terminals having the destination identification name is not limited to an output information signal (destination information signal) transmitted to one output side information equipment (destination information equipment), but is constructed by output information signals (destination information signals) transmitted to plural output side information equipments (destination information equipments) in a certain case. For example, these identification names are names of real or phantom information equipments and the identification codes are numbers.

The control unit will next be explained. This control unit has a switching control data generating means for generating switching control data for simultaneously turning on a combination of cross point switches of cross point phantom identification names (or cross point phantom identification codes) selected among the plural cross point phantom identification names {or cross point phantom identification codes}. The switching control data from this switching control data generating means are supplied to the switching control means and the combination of selected cross point switches of the routing switcher is simultaneously turned on.

This control unit (remote control unit) has plural destination operating switches respectively having destination identification names (or destination identification codes) and plural source operating switches respectively having source identification names (or source identification codes). Each of the destination identification names (or destination identification codes) is provided to an operating button of a destination operating key, or is provided onto a panel on a side of this operating button. Similarly, each of the source identification names (or source identification codes) is provided to an operating button of a source operating key, or is provided onto a panel on a side of this operating button.

A destination operating switch selected among the plural destination operating switches is operated. Thereafter, a source operating switch selected among the plural source operating switches is operated. Thus, switching control data of a cross point phantom identification name (or cross point phantom identification code) according to a combination of the selected destination operating switch and the selected source operating switch are generated from the switching control data generating means.

The switching control data generating means has a memory means for storing plural cross point phantom identification name (or cross point phantom identification code) data of the routing switcher according to a combination of plural destination operating switches and plural source operating switches respectively providing destination identification name (or destination identification code) data and source identification name (or source identification code) data.

The destination identification name (or destination identification code) data are generated by operating a selected one of the plural destination operating switches or the plural destination operating switches. Thereafter, the source identification name data are generated by a selected one of the plural source operating switches or the plural source operating switches. The switching control data of a cross point phantom identification name (or cross point phantom identification code) are read from the memory means on the basis of these destination identification name data and these source identification name data. The switching control data of this cross point phantom identification name are supplied to the switching control means.

One or plural combinations of cross point switches having the cross point phantom identification name (or cross point phantom identification code) of the routing switcher are simultaneously turned on.

Switching data of a cross point phantom identification name (or cross point phantom identification code) having no source identification name (or source identification code) data are read from the memory means by independently operating one portion of the source operating switches irrespective of operations of the destination operating switches. The read switching data are supplied to the switching control means so that one or plural combinations of cross point switches having the cross point phantom identification name of the routing switcher are simultaneously turned on.

An operation of the conventional signal switching apparatus will next be explained with reference to FIG. 1. First, a destination operating switch selected from the plural destination operating switches is operated in advance (an operating button is pushed). Destination identification name data (signal) based on the operation of this destination operating switch are accumulated to a register, etc.

Further, a source operating switch selected from the plural source operating switches of a remote control panel is operated to generate source identification name data (signal) which are accumulated to a register, etc. (step ST-11).

All switching data of a cross point phantom identification name {or cross point phantom identification code} having destination identification name data of the same destination identification name as a destination identification name of the operated destination operating switch are read from the memory means (step ST-12). It is then judged (in step ST-13) whether there are the same source identification name data as source identification names (or source identification codes) of the plural source operating switches or not. If this judgment is NO, when the source operating switch of a source identification name corresponding to switching data of a cross point phantom identification name not having these source identification name data is selected and operated, the switching data of the cross point phantom identification name not having these source identification name data are supplied to the switching control means irrespective of the operation of the destination operating switch. Then, a selected combination of cross point switches of the routing switcher is simultaneously turned on.

When the judgment in the step ST-13 is YES, switching data of a cross point phantom identification name having source identification name data of the same source operating switch as the source identification name of the selected and operated source operating switch are collected in a step ST-14. The collected switching data of the cross point phantom identification name are outputted to an S-BUS (SONY routing switcher remote control cable) (step ST-15) and are supplied to the switching control means. Then, the selected combination of the cross point switches in the routing switcher is simultaneously turned on.

In the above conventional signal switching apparatus, the switching control data generating means has the memory means for storing switching data of plural cross point phantom identification names of the routing switcher according to a combination of the plural destination operating switches and the plural source operating switches respectively providing the destination identification name data and the source identification name data. A destination operating switch selected from the plural destination operating switches is operated. Thereafter, a source operating switch selected from the plural source operating switches is operated. Thus, switching control data of a cross point phantom identification name (or cross point phantom identification code) according to a combination of the selected destination operating switch and the selected source operating switch are obtained from the memory means and are supplied to the switching control means of the routing switcher. Accordingly, it is necessary to set a memory capacity of the memory means to be large.

SUMMARY OF THE INVENTION

In view of such points, the present invention provides a signal switching apparatus for reducing cross point identification name (or cross point identification code) data stored in a memory means and required to generate switching control data of a cross point phantom identification name (or cross point phantom identification code) according to a combination of a selected destination operating switch and a selected source operating switch so that a memory capacity of the memory means can be reduced.

According to an aspect of the present invention, a signal switching method includes a routing switcher having plural input terminals and plural output terminals in which a cross point phantom identification name (or cross point phantom identification code) is provided to a combination of the input terminals and the output terminals, signal is inputted from a predetermined input terminal among the plural input terminals on the basis of the cross point phantom identification name (or cross point phantom identification code), and a signal is outputted from a predetermined output terminal among the plural output terminals, a switching data generating means for generating switching control data for simultaneously turning on a combination of cross point switches of selected cross point phantom identification names (or cross point phantom identification codes) among the plural cross point phantom identification names (or cross point phantom identification codes), a switching control means for controlling the routing switcher on the basis of the switching data from the switching data generating means, plural destination operating switches having a destination identification name provided to a combination of the output terminals of the routing switcher, and plural source operating switches having a source identification name (or source identification code) provided to a combination of the input terminals of the routing switcher, and memory means for additionally storing a source identification name (or source identification code) according to a common combination of the input terminals together with each of the cross point identification names (or cross point identification codes) in a combination of the cross point phantom identification names (or cross point phantom identification codes) and plural cross points having the cross point phantom identification names (or cross point phantom identification codes). The signal switching method includes a first step for selecting the source identification name (or source identification code) by the operating switch, a first judging step for judging whether or not the same source identification name (or source identification code) as the selected source identification name (or source identification code) is included in the cross point phantom identification names (or cross point phantom identification codes) additionally stored in the memory means together with the source identification name (or source identification code), a second step for collecting the cross point phantom identification names (or cross point phantom identification codes) stored in the memory means and having the same source identification name (or source identification code) as the selected source identification name (or source identification code) if the source identification name (or source identification code) selected in the first judging step is included in the cross point phantom identification names (or cross point phantom identification codes) stored in the memory means, a second judging step for judging whether or not a destination identification name (or destination identification code) according to a common combination of the output terminals is set to each of the collected cross point phantom identification names (or cross point phantom identification codes) at the plural cross points having the plural cross point phantom identification names (or cross point phantom identification codes), a third step for adding the destination identification name (or destination identification code) selected by operating the destination operating switches to the cross point phantom identification names (or cross point phantom identification codes) when no destination identification name (or destination identification code) is set in the second judging step, and a fourth step for supplying the cross point phantom identification names (or cross point phantom identification codes) collected in the second or third step from the switching control data generating means to the switching changeover control means as switching control data.

DETAILED DESCRIPTION OF THE PREFERRED EMBODIMENTS

An embodiment of the present invention will next be described with reference to FIGS. 2 to 6.

Figure 1:
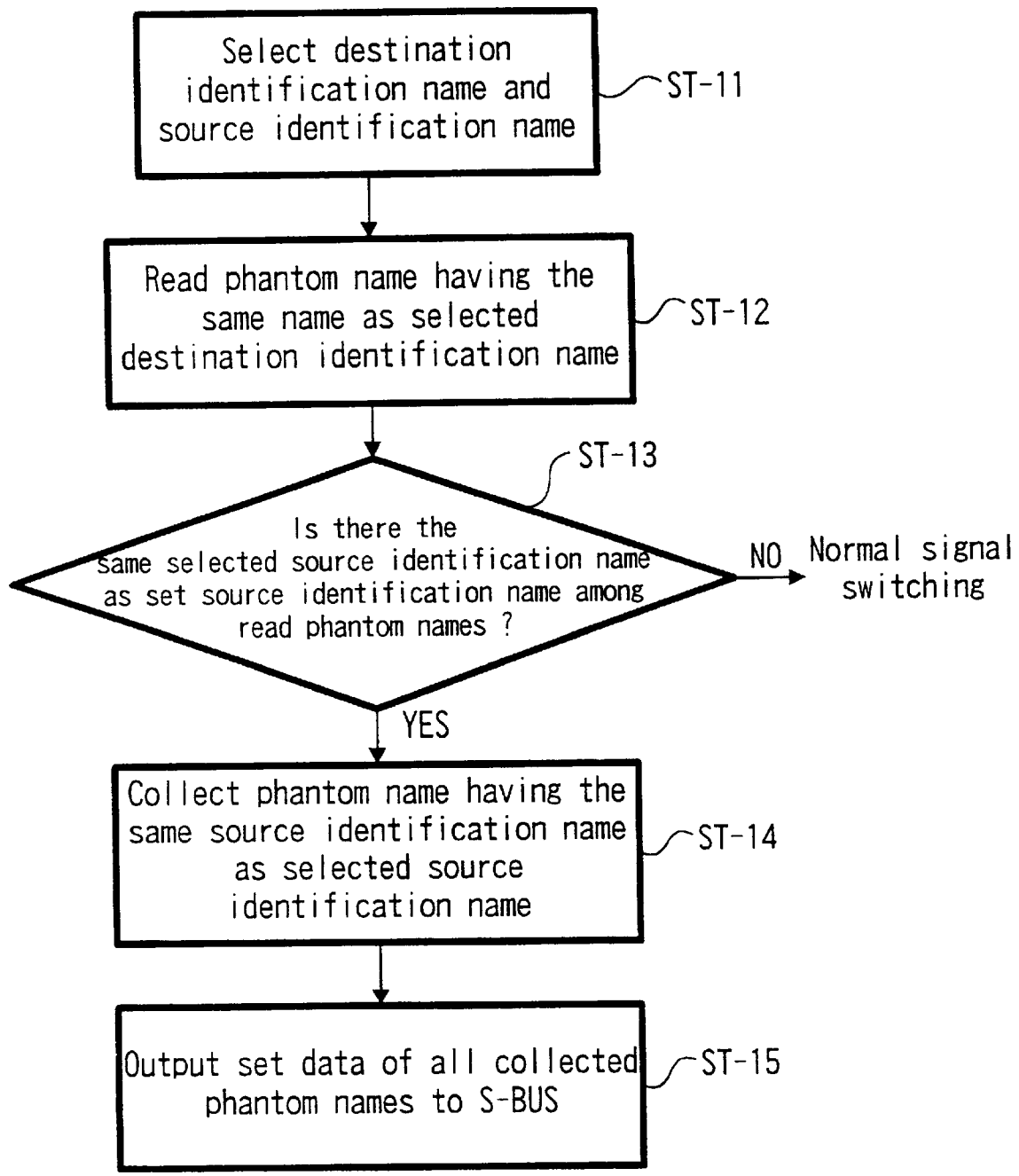
FIG. 1 is a flow chart showing a conventional example.
Figure 2:
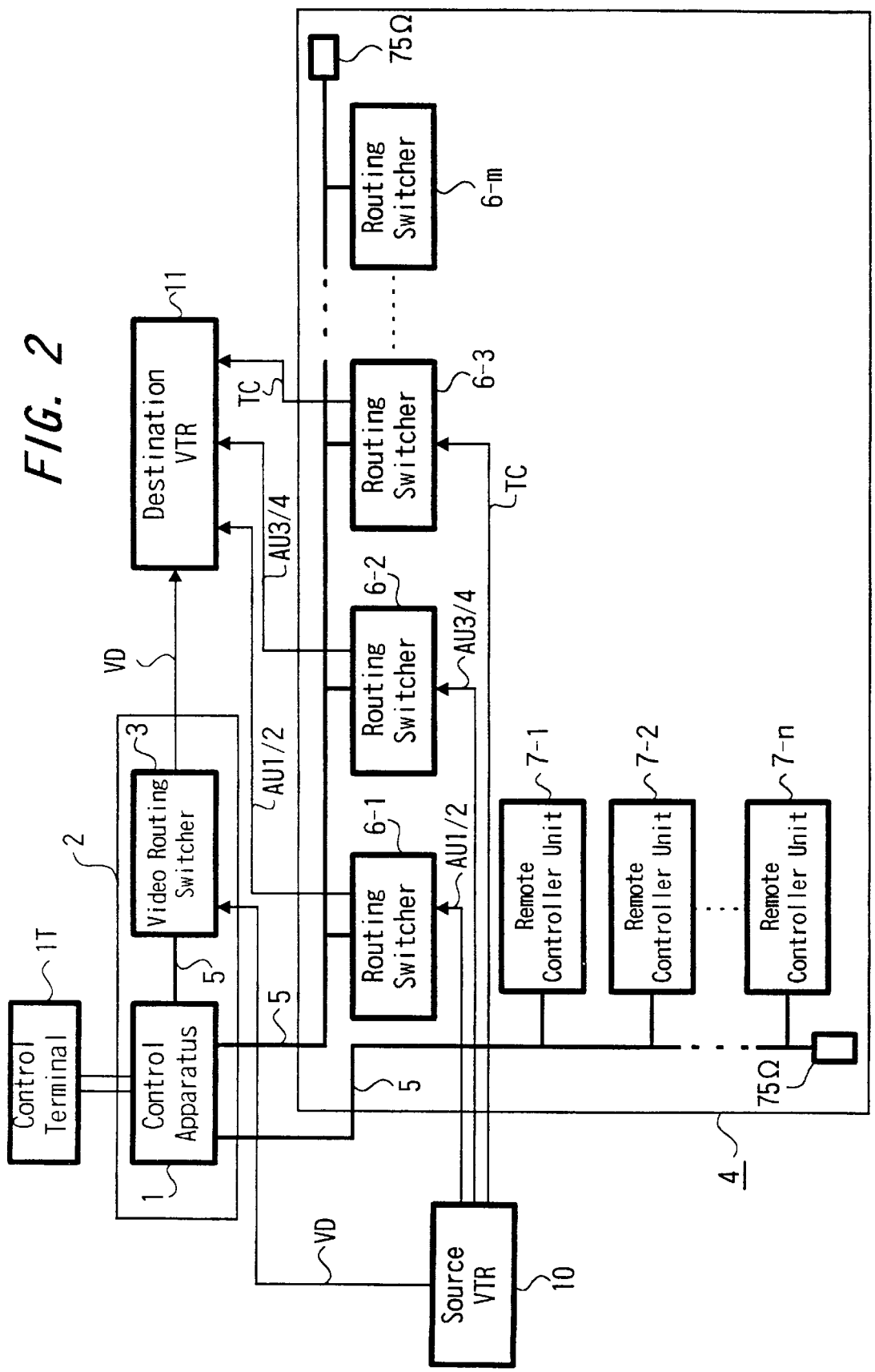
FIG. 2 is a block diagram showing a signal switching apparatus according to an embodiment of the present invention.
Figure 4:
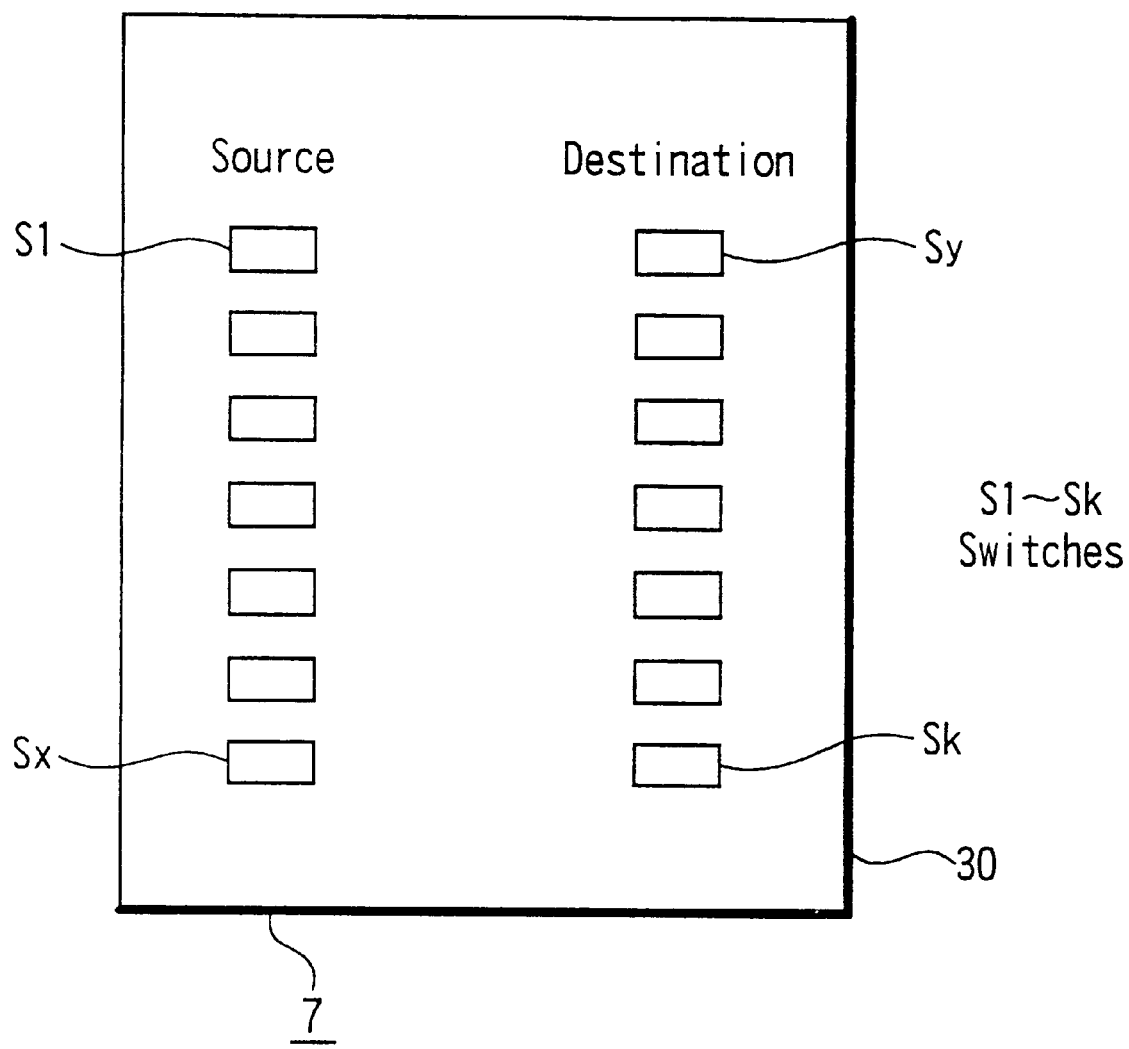
FIG. 4 is a plan view showing a panel of a remote control unit of the embodiment.

A signal switching apparatus according to the embodiment of the present invention will first be explained mainly with reference to FIG. 2. As shown in FIG. 2, there are provided routing switchers (matrix switchers) 3, 6-1, 6-2, 6-3, . . . 6-m. As shown in FIG. 4, for example, each of the routing switchers has 32 input terminals and 32 output terminals. 32 lead wires connected to the 32 input terminals respectively cross 32 lead wires connected to the 32 output terminals. A cross point switch SW is connected to each of intersecting points, namely, each of cross points CP. In this case, the number of cross point switches SW is equal to 32×32=1024.

Each of the input terminals and each of the output terminals are really constructed by a pair of terminals, respectively. Accordingly, crossing lead wires of each of the routing switchers are 32 pairs×32 pairs. In this case, if cross point switches are arranged at both the cross points of each pair of lead wires crossing each other, the number of cross point switches becomes 2048. In contrast to this, if a cross point switch is arranged at only one of both the cross points, the number of cross point switches becomes 1024. However, each input terminal pair and each output terminal pair are respectively set to one terminal to simplify the following explanation.

Figure 3:
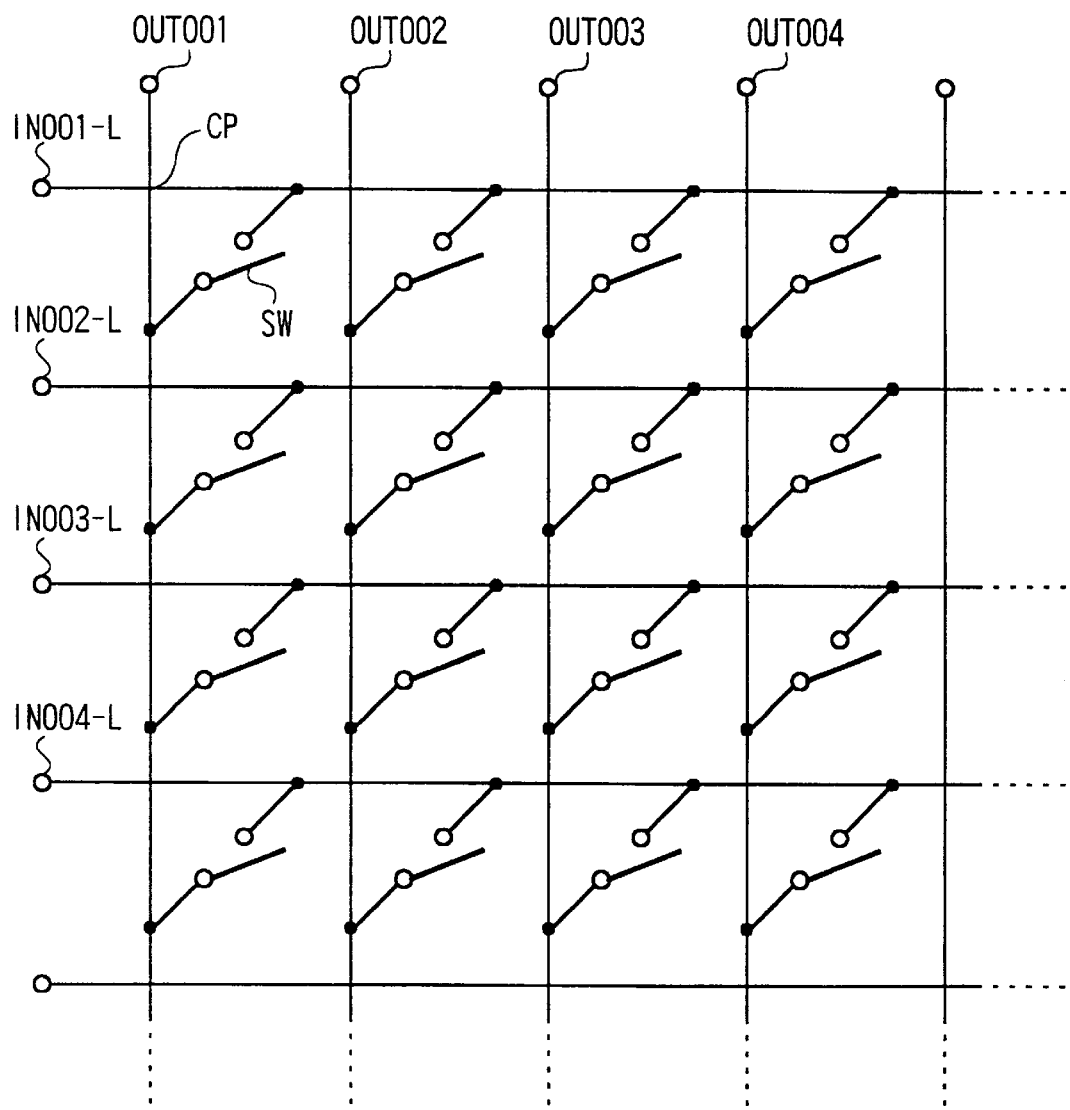
FIG. 3 is a circuit diagram showing a routing switcher.

The routing switchers 3, 6-1, 6-2, 6-3, . . . , 6-m are constructed by switcher plates having the same construction and are arranged such that these switchers constitute layers as a whole. Therefore, as shown in FIG. 3, identification codes IN001-L, IN002-L, . . . , IN032-L are provided to input terminals of the switcher plates of the respective layers. For example, when m=8 is set, 1, 2, . . . 8 respectively corresponding to the routing switchers 3, 6-1, 6-2, 6-3, . . . 6-m are added to these identification codes as layer identification symbols (layer numbers) (level values) L of the switcher plates of the respective layers. Further, identification codes of OUT001, OUT002 . . . , OUT032 are provided to output terminals of the switcher plates of the respective layers. There is a case in which 1, 2, . . . respectively corresponding to the routing switchers 3, 6-1, 6-2, 6-3, . . . , 6-m are added to these identification codes as layer symbols (layer numbers) (level values) L of the switcher plates of the respective layers. The routing switchers 3, 6-1, 6-2, 6-3, . . . 6-m can be constructed by one switcher plate as a whole instead of a layer shape.

In the example shown in FIG. 3, reference number 3 designates a video routing switcher and reference numeral 6-1 designates a routing switcher with respect to audio signals of channels 1 and 2. Reference numeral 6-2 designates a routing switcher with respect to audio signals of channels 3 and 4. Reference numeral 6-3 designates a routing switcher with respect to a time code signal. The remaining routing switchers are various kinds of routing switchers and their concrete signal kinds are omitted. The number of input terminals and the number of output terminals of the routing switchers 3, 6-1, 6-2, 6-3, . . . , 6-m (here, m=8 is set) are respectively equal to 32×8=256. Routing switchers 3, 6-1, 6-2, 6-3 will be mainly explained to simplify the following explanation.

There is a case in which a reproduced video signal VD, audio signals A1/2, A3/4 and a time code signal TC from an input side information equipment such as a certain VTR are supplied to predetermined input terminals among input terminals of the routing switchers 3, 6-1, 6-2, 6-3. There is also a case in which a reproduced video signal VD and a time code signal and two kinds of audio signals A1/2, A3/4 from plural input side information equipment such as VTRs are supplied to the predetermined input terminals. In the latter case, the plural input side information equipments such as a VTR and the two kinds of audio signals are treated as one input side phantom information equipment.

Information signals from plural input side phantom information equipments (e.g., VTRs) connected to the input terminals of the routing switchers 3, 6-1, 6-2, 6-3 can be selectively supplied to plural output side information equipment (e.g., VTRs) of the same switcher plate by turning on only selected predetermined cross point switches of the routing switchers 3, 6-1, 6-2, 6-3.

In FIG. 2, reference numeral 10 designates a VTR (source VTR) as an input side phantom information equipment. For example, the VTR 10 is connected to input terminals IN011-1, IN012-1, IN013-1, IN014-1 among 32 input terminals of the same switcher substrate of one of the routing switchers 3, 6-1, 6-2, 6-3. Thus, a video signal VD, audio signals AU1/2, AU3/4 and a time code signal TC are respectively supplied to the input terminals IN011-1, IN012-1, IN013-1, IN014-1.

As shown in FIG. 2, there is provided a VTR (destination VTR) 11 as an output side information equipment. For example, this VTR 11 is connected to output terminals OUT021, OUT022, OUT023, OUT024 among 32 output terminals of the same switcher substrate as the switcher substrate of each of the input terminals IN011-1, IN012-1, IN013-1, IN014-1 of the routing switchers 3, 6-1, 6-2, 6-3. Thus, when only cross point switches SW at respective cross points CP of the input terminals IN011-1, IN012-1, IN013-1, IN014-1 and the output terminals OUT021, OUT022, OUT023, OUT024 are turned on, the video signal VD, the audio signals AU1/2, AU3/4 and the time code signal TC from the source VTR 10 are supplied to the destination VTR 11 through the output terminals OUT021, OUT022, OUT023, OUT024, respectively.

In the example shown in FIG. 2, there is provided a controller 1 having a CPU, a ROM and a RAM. The controller 1 generates a switching control signal for turning on only a predetermined cross point switch among the respective cross point switches SW of the routing switchers 3, 6-1, 6-2, 6-3, . . . . . . . , 6-m from the switching control means within the controller 1 on the basis of remote control signals (switching control data for simultaneously turning on a combination of cross point switches of selected cross point phantom identification names among plural cross point phantom identification names (or cross point phantom identification codes)) from remote controller units (remote control units) 7-1, 7-2, . . . 7-n connected to the controller 1 through S-BUS (routing switcher remote control cable) (coaxial cable) 5. This switching control signal is supplied to the video routing switcher 3 and is supplied to the routing switchers 6-1, 6-2, 6-3 through the S-BUS 5.

Reference numeral IT designates a control terminal (having an input device such as a keyboard, etc. and an output device such as a monitor receiver, etc.) with respect to the controller 1. The control terminal IT is connected to the controller 1 through a cable 9. A T-type bridge is connected to a branching point of the S-BUS 5 and a terminal unit of 75Ω is connected to the end of the S-BUS 5.

Here, reference numerals 2 and 4 are respectively set to primary and secondary communication stations. The controller 1 and the video routing switcher 3 are arranged in the primary communication station 2. The routing switchers 6-1, 6-2, 6-3, . . . , 6-m and the remote control units 7-1, 7-2, . . . , 7-n are arranged in the secondary communication station 4.

Communication is performed between the primary communication station 2 and the secondary communication station 4 through the S-BUS 5.

Plural combinations of the cross point switches are set in each of the routing switchers 3, 6-1 to 6-m. Phantom identification names {or phantom identification codes} are provided to the respective combinations of the cross point switches. For example, the phantom identification names are nicknames and the phantom identification codes are numbers.

A source identification name (or source identification code) and a destination identification name are respectively provided to a combination of input terminals and a combination of output terminals corresponding to a certain combination of the cross point switches of the routing switchers 3, 6-1 to 6-m. An input information signal (source information signal) supplied to the combination of the input terminals having the source identification name (or source identification code) is not limited to an information signal from one input side information equipment (source information equipment), but is constructed by information signals from plural input side information equipments in a certain case. Similarly, an output information signal (destination information signal) outputted from the combination of the output terminals having the destination identification name (or destination identification code) is not limited to an information signal from one output side information equipment (destination information equipment), but is constructed by information signals from plural output side information equipments in a certain case. For example, these identification names are names of real or phantom information equipments and the identification codes are numbers.

The control units 7-1 to 7-n will next be explained. Each of the control units 7-1 to 7-n has a switching control data generating means for generating switching control data for simultaneously turning on a combination of the cross point switches of selected cross point phantom identification names among the plural cross point phantom identification names (or cross point phantom identification codes). The switching control data from the switching control data generating means are supplied to the switching control means within the controller 1 through the S-BUS 5 so as to simultaneously turn on the combination of the selected cross point switches of each of the routing switchers 3, 6-1 to 6-m.

As shown in FIG. 4, each of the control units (remote control units) 7-1 to 7-n has plural source operating switches (including operating buttons) S1 to Sx (x is an integer equal to or greater than 1) respectively having source identification names (or source identification codes) and has plural destination operating switches (including operating buttons) Sy to Sk (y=x+1, k is an integer equal to or greater than y) respectively having destination identification names (or destination identification codes). The source identification names (or source identification codes) are provided to the operating buttons of source operating keys or are provided onto a panel on a side of these operating buttons. Similarly, the destination identification names (or destination identification codes) are provided to the operating buttons of destination operating keys or are provided onto a panel on a side of these operating buttons.

A selected destination operating switch among the plural destination operating switches Sy to Sk is operated. Thereafter, a selected source operating switch among the plural source operating switches S1 to Sx is operated. Thus, switching control data of a cross point phantom identification name according to a combination of the selected destination operating switch and the selected source operating switch are generated from the switching control data generating means built in the remote control unit 7.

The construction of the remote control unit 7 (showing each of the remote control units 7-1, 7-2, . . . , 7-n having the same construction) will next be explained with reference to FIG. 5. A CPU 23 (control IC) is connected to a terminal 20 through buffers 21, 22 connected in parallel to each other in opposed directions. The terminal 20 is connected to the S-BUS 5 of FIG. 2 through a T-side bridge. The CPU 23 is operated on the basis of an operating procedure program stored in a ROM 24. Reference numeral 26 designates a RAM in which stored contents are held by a battery 27.

In a combination of cross point switches having a cross point phantom identification name (or cross point phantom identification code) of each of the routing switchers, a cross point identification name (or cross point identification code) different from the cross point phantom identification name (or cross point phantom identification code) is provided to a combination of cross point switches having a common combination of input terminals.

In a common combination of output terminals, destination identification name (or destination identification code) data according to this common combination of output terminals are added to switching control data of such a cross point identification name (or cross point identification code). No source identification name (or source identification code) data are added to these switching control data. {The source identification name (or source identification code) data may be added to these switching control data, but are not added here.} Source identification name (or source identification code) data according to the cross point identification name (or cross point identification code) are added to the switching control data with respect to an uncommon combination of output terminals. However, no destination identification name (or destination identification code) data are added to these switching control data. The switching control data of such a cross point identification name (or cross point identification code) are stored in the RAM 26.

A RAM 25 is provided. All switching control data of a cross point identification name (or cross point identification code) read from the RAM 26 are temporarily stored in the RAM 25. An address signal AD is supplied from the CPU 23 to the ROM 24, the RAM 25 and the RAM 26, and their writing and reading operations are controlled.

Figure 5:
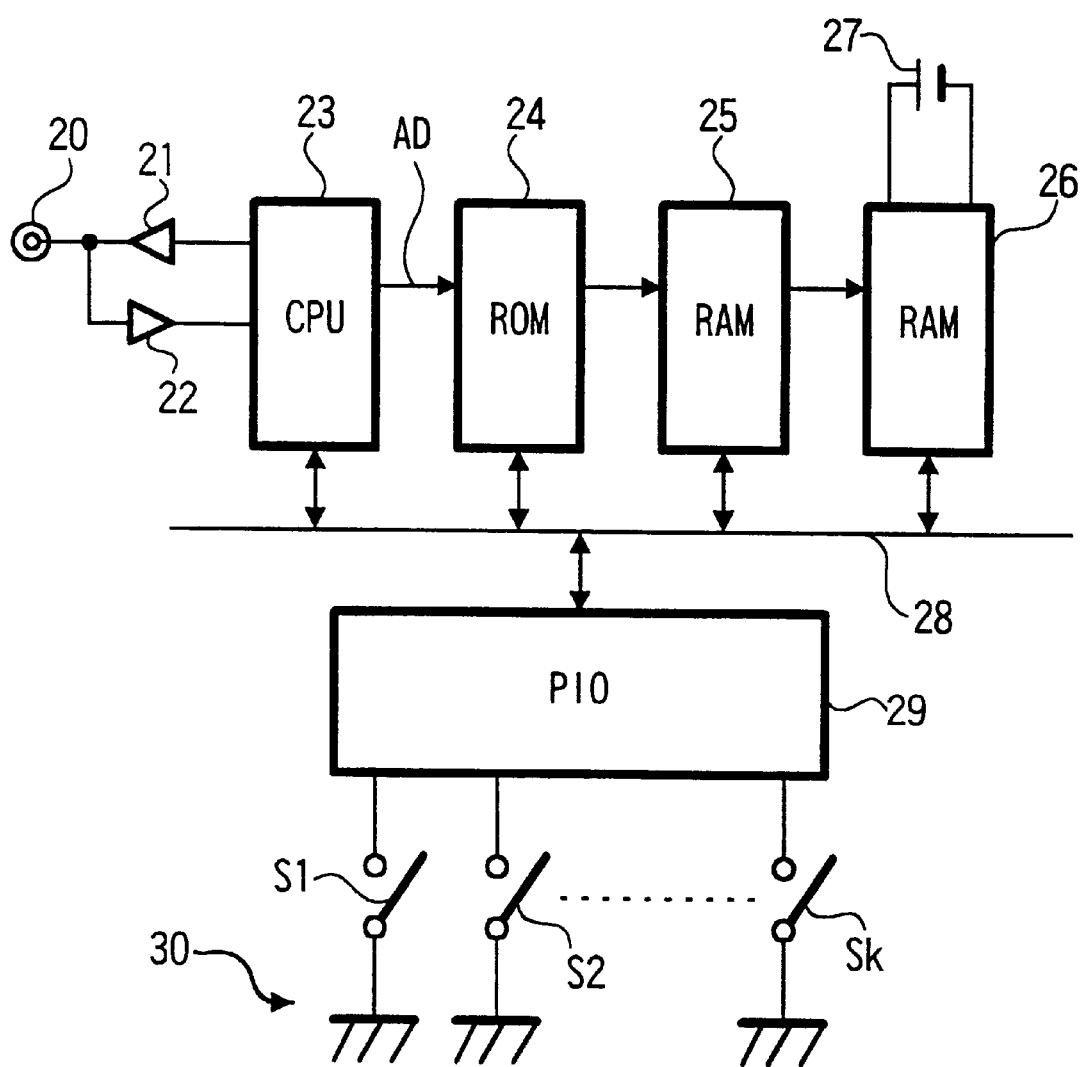
FIG. 5 is a block diagram showing a an example of an arrangement of the remote control unit of the embodiment.

In FIG. 5, reference numerals S1 to Sk designate the above plural source operating switches and the plural destination operating switches. These operating switches S1 to Sk are connected to a data bus 28 commonly to which connected are the CPU 23, the ROM 24 and the RAMs 25, 26 through a parallel input output interface (PIO) 29.

An operation of each of the remote control units shown in FIG. 5 performed by a function of the CPU 23 will next be explained with reference to FIG. 6. First, a selected destination operating switch among the plural destination operating switches Sy to Sk arranged on a panel 30 of the remote control unit 7 is operated in advance (an operating button is pushed). Destination identification name (or destination identification code) data based on the operation of the destination operating switch and showing the selected destination operating switch are accumulated to a register, etc.

The plural source operating switches S1 to Sx of the remote control panel 30 are selectively operated, and source identification name (or source identification code) data signal) based on this operation and showing the selected source operating switch are generated and accumulated to a register, etc. in a step ST-1.

All switching control data of a cross point identification name (or cross point identification code) read from the RAM 26 are temporarily stored in the RAM 25. It is then judged in a step ST-2 whether or not there are the same source identification name data as source identification names of the plural source operating switches among the switching control data of a cross point identification name to which the same destination identification name data as a destination identification name of the operated destination operating switch are added. If this judgment is NO, the switching control data of a cross point identification name not having the source identification name data are supplied to the switching control means of the controller 1 as switching control data of a cross point phantom identification name irrespective of operations of the destination operating switches when the source operating switch of a source identification name corresponding to source phantom identification name data is selected and operated. Then, a combination of cross point switches according to the destination identification name of destination identification name data added to the switching control data of the cross point identification name of the routing switcher is simultaneously turned on.

When the judgment in the step ST-2 is YES, the switching control data of a cross point identification name having source identification name data of the same source operating switch as the source identification name of the selected and operated source operating switch are collected in a step ST-3.

In a step ST-4, it is judged whether or not the destination identification name is added to the collected switching control data of the cross point identification name. When the judgment in the step ST-4 is NO, the destination identification name data of the operated destination operating switch are read from the register and are added to the cross point identification name data by the CPU 23 and are set to switching control data of the cross point phantom identification name (step ST-6). In contrast to this, when the judgment in the step ST-4 is YES, the destination identification name data are already added to the switching control data of the cross point identification name so that the control data are set to switching control data of the cross point phantom identification name as they are. In a step ST-5, all collected switching control data of the cross point phantom identification name are outputted to the S-BUS (routing switcher remote control cable) 5 and are supplied to the switching control means. Then, a selected combination of cross point switches of the routing switcher is simultaneously turned on.

In a common combination of output terminals, destination identification name (or destination identification code) data according to this common combination of output terminals are added to the switching control data of the cross point identification name (or cross point identification code) stored in the RAM 26. When source identification name (or source identification code) data are also added to these switching control data, the step ST-2 is omitted. When the source operating switch of a source identification name corresponding to these source phantom identification name data is selected and operated in a step ST-5, these switching control data are supplied to the switching control means of the controller 1 as switching control data of the cross point phantom identification name irrespective of the operations of the destination operating switches. Then, a combination of cross point switches according to the destination identification name of the destination identification name data added to the switching control data of the cross point identification name of the routing switcher is simultaneously turned on.

Figure 6:
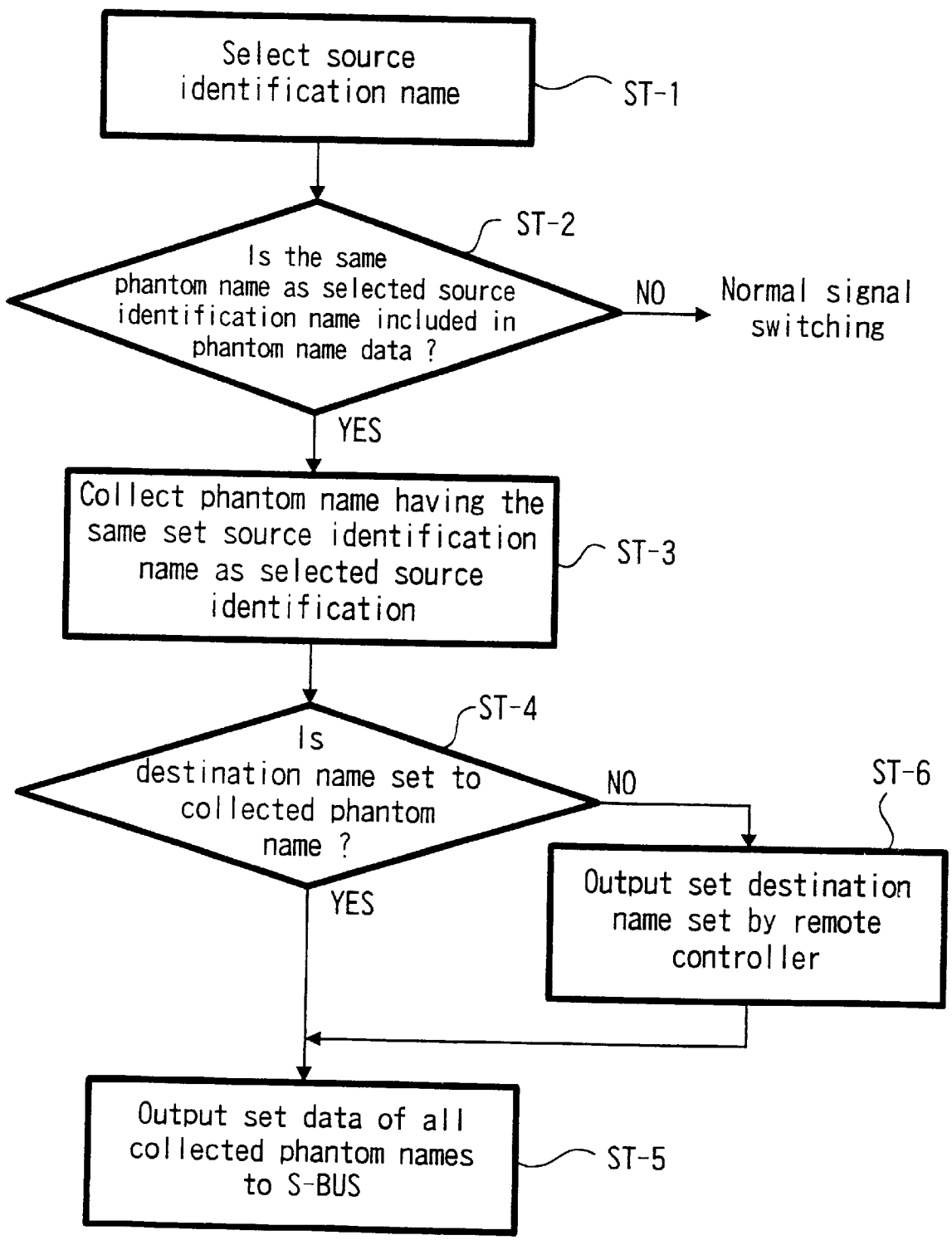
FIG. 6 is a flow chart showing the embodiment form of the present invention.
Figure 7:
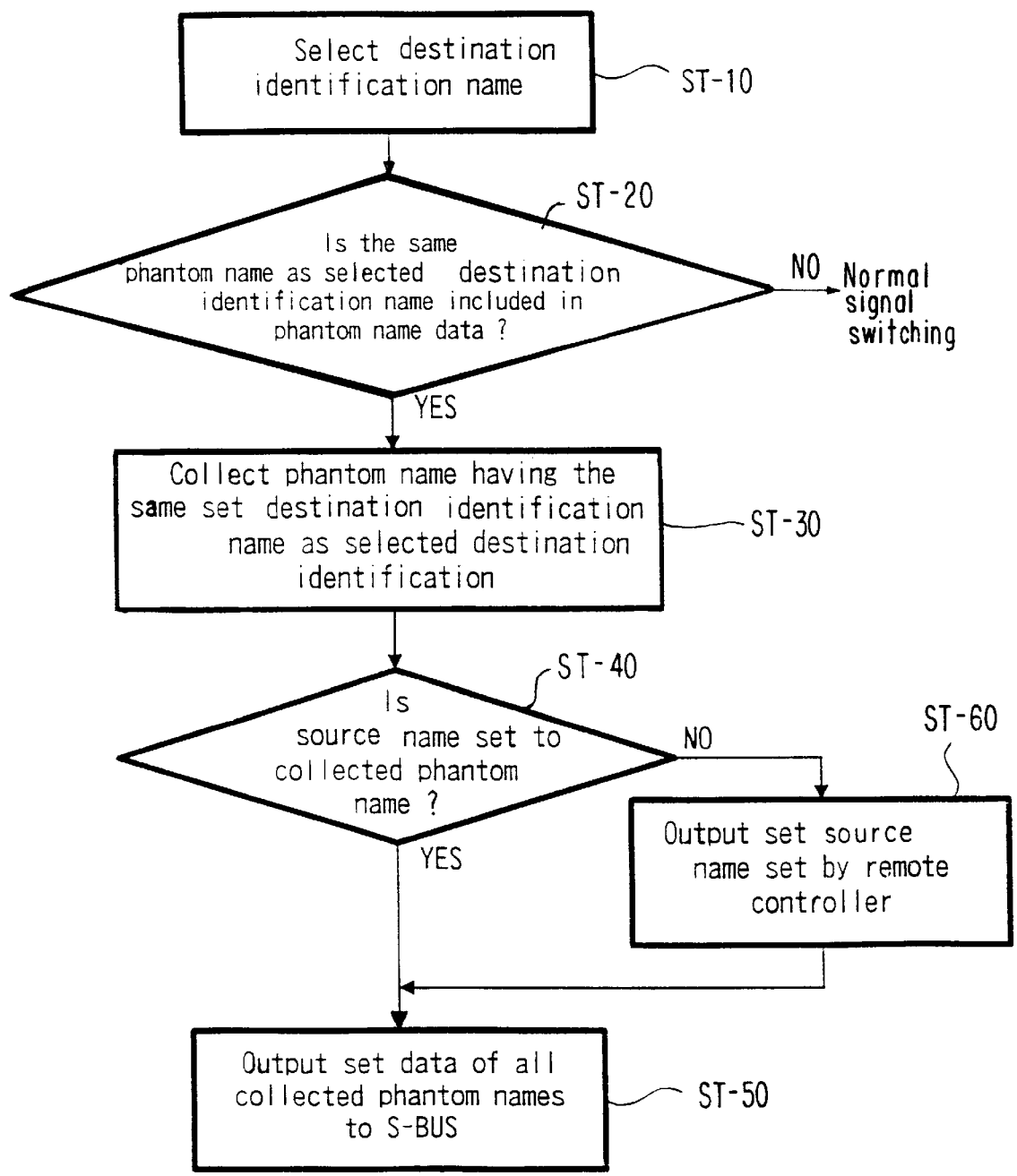
FIG. 7 is a flow chart showing another embodiment form of the present invention.

FIG. 7 depicts an embodiment of the invention similar to that shown in FIG. 6, but wherein the cross point data includes various cross point identification names including the same destination identification name as destination identification names of the plural destinating operating switches, and those destination identification names designate one or more source names. As is shown in Step ST-10 a destination identification name is selected, and at Step ST-20 it is determined whether a phantom name corresponding to the destination identification name is included in phantom name data. If this inquiry is answered in the negative, normal switching is performed. If this inquiry is answered in the affirmative, phantom names having the same destination identification name as the selected destination identification are collected in Step ST-30. Thereafter, in Step ST-40 is determined whether a source name is set for the collected phantom names. If answered in the affirmative, the collected phantom names are output in Step ST-50. However, if in Step ST-40 the inquiry is answered in the negative, and no source name is set corresponding to the collected phantom names all having the same destination identification name, then in Step ST-60 the source name set by the remote controller is output, and thereafter control passes once again to Step ST-50 where all collected phantom names are output. Thus, the embodiment of FIG. 7 operates in a manner parallel to the embodiment of FIG. 6, but wherein a single destination address is utilized in accordance with multiple phantom names rather than in FIG. 6 where a single source identification name is utilized.

One cross point phantom identification name (cross point phantom identification code) data (phantom data) are set to "phantom name: output terminal name<input terminal name, level value". Next, six kinds of phantoms are set. Each of these names is an identification symbol. A symbol having a number of three digits subsequent to PH shows a phantom number. A phantom data example will next be shown.

(1) PH001:OUT001<IN002-0 This phantom number shows the following contents. When signal switching of the phantom PH001 is executed, the input terminal IN002 is connected to the output terminal OUT001 by turning on the cross point switch at the cross point between the input terminal IN002 and the output terminal OUT001. The input terminal IN002 has no level value (a layer number of a multilayer routing switcher) so that the level value is supplied from the output terminal OUT001.

(2) PH002:OUT001<IN002-1 This phantom number shows the following contents. When signal switching of the phantom PH002 is executed, the cross point switch between the input terminal IN002 and the output terminal OUT001 is turned on so that the input terminal IN002 is connected to the output terminal OUT001. The level value of the input terminal is 1.

(3) PH003: <IN002-1 This phantom number shows the following contents. When signal switching of PH004 is executed, a selected destination identification name (or destination identification code) is set by operating the input terminal IN002 and an operating button of the panel 30 of the remote control unit. The level value of the input terminal becomes 1.

In accordance with the above first invention, the number of cross point identification name (or cross point identification code) data stored in a memory means and required to generate switching control data of a cross point phantom identification name (or cross point phantom identification code) according to a combination of a selected destination operating switch and a selected source operating switch is reduced. {The number of cross point identification name (or cross point identification code) data stored in the memory means is reduced.} This number is equal to a number obtained by dividing the number of switching control data of cross point phantom identification names (or cross point phantom identification codes) stored in the memory means in a conventional example by the number of combinations of output terminals of routing switchers. Accordingly, it is possible to provide a signal switching apparatus capable of reducing the memory capacity of its memory means. Thus, a switching control data generating means including the memory means and a switching control data forming means is easily constructed by a remote controller so that the switching control data are easily generated.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A signal switching method for use with a routing switcher having plural input terminals and plural output terminals in which a cross point phantom identification name is assigned to each combination of one of said input terminals and one of each of said output terminals, each of said combinations of input and output terminals being represented by a particular cross point phantom identification name being switched to by the operation of a source operation switch associated with said corresponding input terminal and a destination operation switch associated with said corresponding output terminal, the method comprising the steps of:

storing in memory as cross point identification data said cross point identification name associated with a desired input terminal;

selecting said source operation switch corresponding to said input terminal of said cross point identification data;

determining whether said cross point identification data includes an associated output terminal;

if said cross point identification data includes an associated output terminal, selecting said destination operation switch corresponding to said output terminal of said cross point identification data;

if said cross point identification data does not include an associated output terminal, providing said associated output terminal, and selecting said destination operation switch corresponding to said provided output terminal; and switching said routing switch to connect said input and output terminal through the operation of said associated respective source and destination operation switches.

2. A signal switching method for use with a routing switcher having plural input terminals and plural output terminals in which a cross point phantom identification name is assigned to each combination of one of said input terminals and one of said output terminals, each of said combinations of input and output terminals being represented by a particular cross point phantom identification name being switched to by the operation of a source operation switch associated with said corresponding input terminal and a destination operation switch associated with said corresponding output terminal, the method comprising the steps of:

storing in memory as cross point identification data said cross point identification name associated with a desired output terminal;

selecting said destination operation switch corresponding to said output terminal of said cross point identification data;

determining whether said cross point identification data includes an associated input terminal;

if said cross point identification data includes an associated input terminal, selecting said source operation switch corresponding to said input terminal of said cross point identification data;

if said cross point identification data does not include an associated input terminal, providing said associated input terminal, and selecting said source operation switch corresponding to said provided input terminal; and switching said routing switch to connect said input and output terminal through the operation of said associated respective source and destination operation switches.

3. A signal switching apparatus for use with a routing switcher having plural input terminals and plural output terminals in which a cross point phantom identification name is assigned to each combination of one of said input terminals and one of said output terminals, each of said combinations of input and output terminals being represented by a particular cross point phantom identification name being switched to by the operation of a source operation switch associated with said corresponding input terminal and a destination operation switch associated with said corresponding output terminal, comprising:

a memory for storing as cross point identification data said cross point identification name associated with a desired input terminal;

means for selecting said source operation switch corresponding to said input terminal of said cross point identification data;

means for determining whether said cross point identification data includes an associated output terminal;

means for selecting said destination operation switch corresponding to said output terminal of said cross point identification data if said cross point identification data includes an associated output terminal;

means for providing said associated output terminal, and selecting said destination operation switch corresponding to said provided output terminal if said cross point identification data does not include an associated output terminal; and means for switching said routing switch to connect said input and output terminal through the operation of said associated respective source and destination operation switches.

4. A signal switching apparatus for use with a routing switcher having plural input terminals and plural output terminals in which a cross point phantom identification name is assigned to each combination of one of said input terminals and one of said output terminals, each of said combinations of input and output terminals being represented by a particular cross point phantom identification name being switched to by the operation of a source operation switch associated with said corresponding input terminal and a destination operation switch associated with said corresponding output terminal, the method comprising the steps of:

a memory for storing as cross point identification data said cross point identification name associated with a desired output terminal;

means for selecting said destination operation switch corresponding to said output terminal of said cross point identification data;

means for determining whether said cross point identification data includes an associated input terminal;

means for selecting said source operation switch corresponding to said input terminal of said cross point identification data if said cross point identification data includes an associated input terminal;

means for providing said associated input terminal, and selecting said source operation switch corresponding to said provided input terminal if said cross point identification data does not include an associated input terminal; and means for switching said routing switch to connect said input and output terminal through the operation of said associated respective source and destination operation switches.

* * * * *